US Patent Office 3,592,954
Patented July 13, 1971

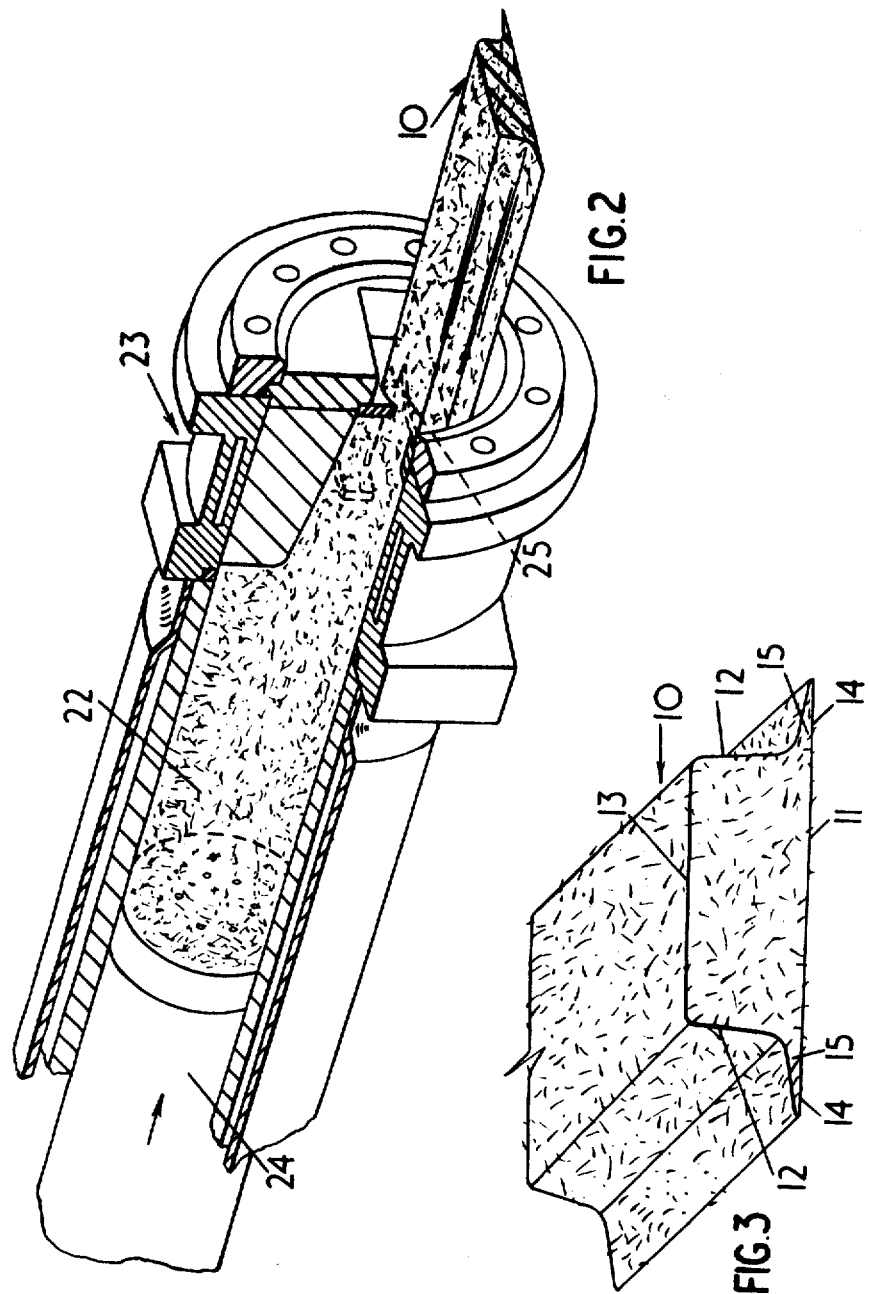

3,592,954
EXTRUSION OF TYRE LUGS CONTAINING SHREDDED METAL WIRE
Frederick Widdowson, Grantham, England, assignor to Vacu-Lug Traction Tyres Limited, Grantham, England
Filed Aug. 28, 1967, Ser. No. 663,667
Claims priority, application Great Britain, Sept. 2, 1966, 39,394/66
Int. Cl. B29c 17/14; B29d 3/02; B60c 9/00
U.S. Cl. 264—108        5 Claims

ABSTRACT OF THE DISCLOSURE

A method of producing tyre lug stock having between 3% and 5%, by weight, of discrete lengths of shredded filamentary metal wire, distributed throughout the material forming the lug stock which is extruded through a ram type extruder prior to severance into replacement tyre lugs.

---

The present invention relates to tyre lugs as used in the manufacture or re-conditioning of tyres, and its object is to increase the cut growth resistance of the lugs during operational service.

Tyres having wire-reinforced layers to increase their resistance to pentration by sharp objects are known, but it has proved extremely difficult, if not impossible, to disperse sufficient shredded wire throughout the tread volume of a tyre due to the serious flow restriction of the rubber which occurs during moulding.

The present invention consists in a method of producing a replacement lug or lug stock for tyres comprising the steps of introducing between 3% and 5%, by weight, of discrete lengths of shredded filamentary steel wire into rubber material on a mill and then placing the fire-impregnated material into a ram type extruder for forming into lug stock which is subsequently severed into replacement lugs.

The invention further consists in a replacement lug or lug stock for tyres made according to the method set out in the preceding paragraph, said lug or lug stock containing between 3% and 5%, by weight, of discrete lengths of randomly disposed, shredded, filamentary steel wire.

In the accompanying drawings:

FIG. 2 is a perspective view, partly in section, of a ram type extruder suitable for producing lug stock according to the present invention, and FIG. 3 is a perspective view of a portion of wire-impregnated lug stock according to the present invention.

Figure 1:
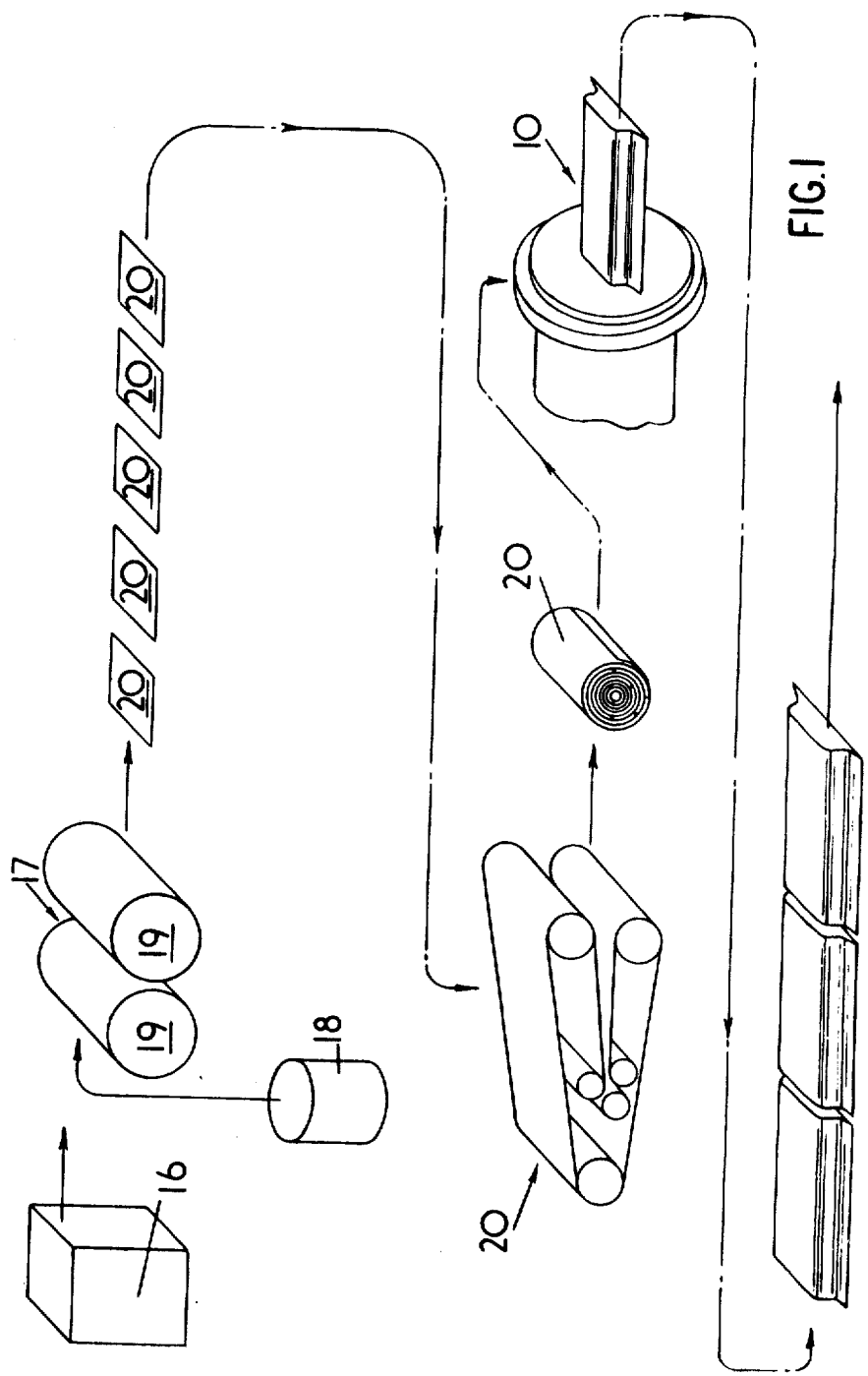
FIG. 1 is a flow diagram showing the various steps in the method of producing lugs or lug stock according to the present invention.

In carrying the invention into effect according to one convenient mode, by way of example, the lug or lug stock 10 (see FIG. 3) includes a base portion 11 having upstanding side walls 12 interconnected by a thread portion 13. Each side of the base portion 11 has an integrally formed, outwardly extending wing or flange 14 of relatively thin, triangular cross section as indicated at 15, the base of the triangle being positioned adjacent the associated side wall 12.

Such lugs or lug stock 10 is now well-known in the art and further description relating to the methods of attaching same to a tyre body is deemed to be unnecessary.

According to the present invention, the lug stock 10 contains between 3% and 5%, by weight, of discrete lengths or randomly disposed, shredded, filamentary steel wire. Preferably, the lug stock contains 4%, by weight, of the steel wire and preferably such wire is approximately 0.006 inch diameter and is shredded into approximately 0.4 inch lengths.

The following method, which is clearly shown in FIG. 1, is used to produce the shredded wire lug stock.

The rubber material, or stock 16 is placed on a mill 17 and initially masticated. Shredded wire of the size referred to above is conveyed from a container 18 and evenly distributed along the roller 19 of the mill 17 so that the short lengths of wire are uniformly and randomly dispersed throughout the rubber mass.

Sheets 20 of the wire-impregnated material are cut from the mill 17 and conveyed to a roll former 21, from where the now rolled sheets 20 are placed in the barrel 22 of a ram type extruder 23 as shown in detail in FIG. 2. The rolled sheet 20 is then forced by a ram 24 through a die 25 under hydraulic pressure to form the lug stock 10.

As referred to above, if rubber material containing shredded wire is subsequently moulded, the presence of the wire could restrict the flow of rubber and, furthermore, it is doubtful whether the wire would move in the same ratio as the rubber, but in the method set out above, the inclusion of the shredded wire within the lug stock material ensures its even distribution throughout the material, as no displacement of the wire takes place during vulcanization.

I claim:

1. A method of producing a lug stock for tyres comprising the steps of introducing between 3% and 5%, by weight, of discrete lengths of shredded filamentary metal wire into rubber material and then extruding the wire-impregnated material under pressure for forming into lug stock which is adapted to be subsequently severed into replacement lugs.

2. A method of producing a lug stock as claimed in claim 1, wherein the shredded wire content is 4%.

3. A method of producing a lug stock as claimed in claim 2, wherein the wire-impregnated material is formed into rolled sheets prior to being extruded and said extrusion is carried out in a ram type extruder.

4. A method of producing a lug stock as claimed in claim 3, wherein the shredded wire is approximately 0.006 inch diameter.

5. A method of producing a lug stock as claimed in claim 4, wherein the shredded wire is approximately 0.4 inch in length.

References Cited

UNITED STATES PATENTS

| | | | |
|---|---|---|---|
| 2,135,395 | 11/1938 | Holzapfel | 264—75 |
| 2,345,518 | 3/1944 | Wendel | 152—209 |
| 3,111,975 | 11/1963 | Sanders et al. | 152—361 |
| 3,149,658 | 9/1964 | Wolfe | 264—36 |

FOREIGN PATENTS

| | | | |
|---|---|---|---|
| 216,506 | 8/1958 | Australia | 264—36 |

ROBERT F. WHITE, Primary Examiner
J. R. THURLOW, Assistant Examiner

U.S. Cl. X.R.
152—209, 361; 156—128; 264—148, 175, 177, 323